UNITED STATES PATENT OFFICE.

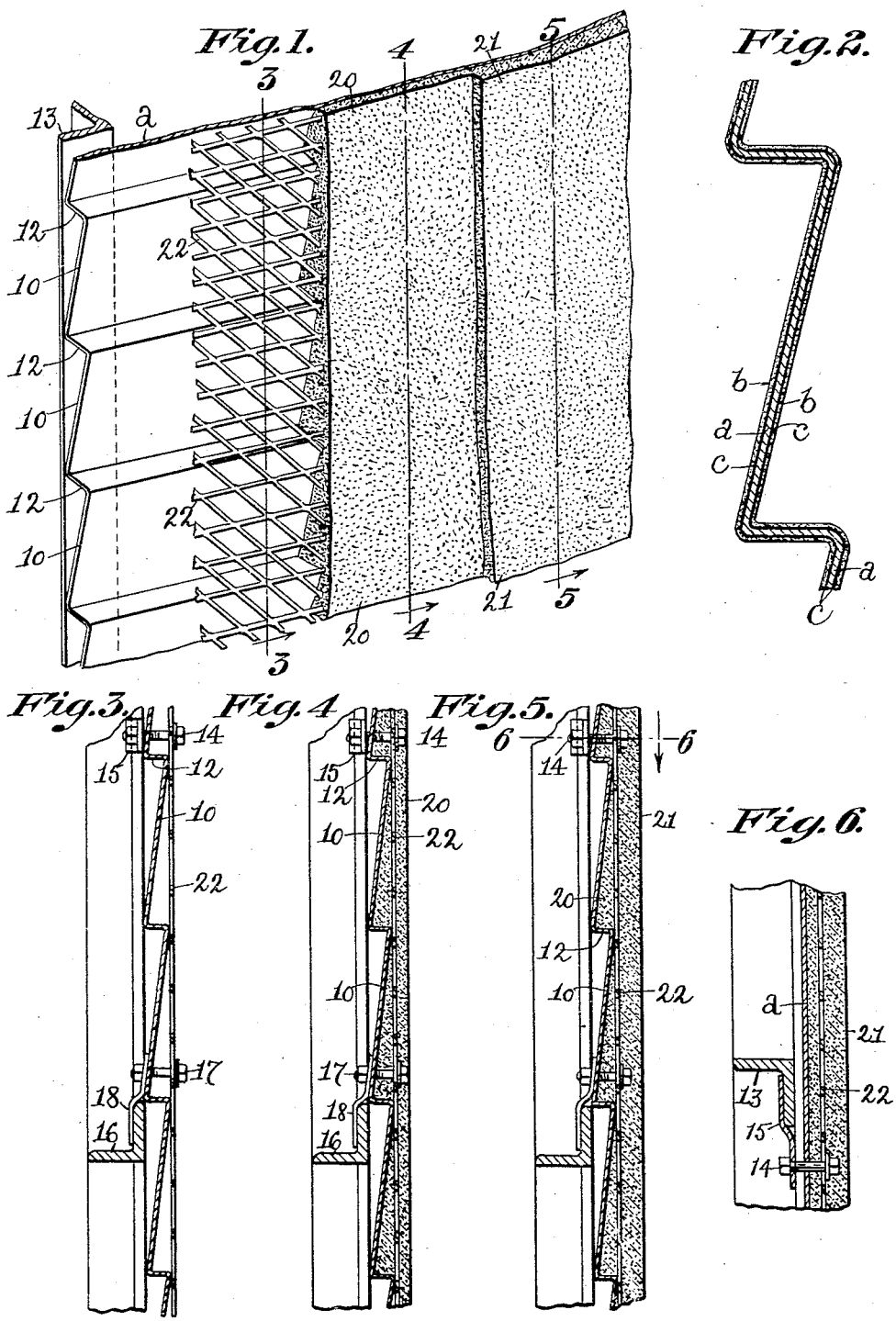

PEREZ M. STEWART, OF NEW YORK, N. Y., ASSIGNOR, BY MESNE ASSIGNMENTS, TO ASBESTOS PROTECTED METAL CO., A CORPORATION OF MASSACHUSETTS.

COMPOSITE BUILDING STRUCTURE.

1,068,541.   Specification of Letters Patent.   Patented July 29, 1913.

Application filed February 12, 1912. Serial No. 676,992.

*To all whom it may concern:*

Be it known that I, PEREZ M. STEWART, a citizen of the United States, residing in the borough of Manhattan, city, county, and State of New York, have invented an Improvement in Composite Building Structures, of which the following description, in connection with the accompanying drawings, is a specification, like letters on the drawings representing like parts.

This invention relates to a composite building structure of sheet metal and plastic material, which is reinforced, and is especially adapted for use in a building as a wall or siding.

The invention has for its object to provide a superior, light and fire-proof wall or siding, as will be described. To this end, I employ a metal sheet, composed of asbestos protected metal, in which layers or sheets of fire-proof material such as asbestos are affixed to the opposite sides of the metal sheet by asphaltum or like cement. The substantially horizontal members of the clapboard sheet form a series of shelves for supporting plastic material such as concrete, which may and preferably will be reinforced as will be described. These and other features of this invention will be pointed out in the claim at the end of this specification.

Figure 1 is a perspective with parts broken away of a wall embodying this invention. Fig. 2, a section on an enlarged scale of the clapboard-asbestos protected metal sheet shown in Fig. 1. Fig. 3, a section on the line 3—3, Fig. 1. Fig. 4, a section on the line 4—4, Fig. 1. Fig. 5, a section on the line 5—5, Fig. 1, and Fig. 6, a section on the line 6—6, Fig. 5.

Referring to the drawings, *a* represents the clapboard metal sheet, which is a sheet of asbestos protected metal, in which the metal sheet *a* is provided on its opposite surfaces with layers *b* of asbestos or like fire-proof material, cemented to the metal sheet *a* by layers *c* of asphalt or other cement. The clapboard metal sheet *a* is bent, formed or shaped to form a plurality of substantially parallel inclined sections or members 10 and substantially horizontal members or sections 12, which connect the lower end of one inclined section with the upper end of the next adjacent inclined section. The clapboard sheet *a* may be secured to vertical supports 13, such as angle irons, by means of fastening devices, which are herein shown as bolts 14 and metal dogs or clips 15, and said clapboard sheet may also be secured to horizontal supports, shown as angle irons 16, by similar bolts 17 and clips 18. The horizontal sections or members 12 of the clapboard sheet form shelves for supporting plastic material 20, such as plaster, concrete or cement, which is applied to the rear side of the clapboard sheet in a plastic condition and which is strengthened by a metal reinforcement, which is herein shown as a sheet 22 of expanded metal, which is secured to the clapboard sheet *a* by the bolts 14, 17.

The reinforcing metal sheet 22 is secured to the clapboard sheet *a* before the plastic material is applied, after which the plastic material is applied by a trowel or other means, so as to contact with the rear surface of the clapboard sheet and form a clapboard of plastic material, which matches with the clapboard sheet and not only adheres thereto but rests upon the substantially horizontal members or sections 12 thereof, whereby a superior adhesion of the plastic material to the clapboard sheet is obtained. The plastic material 20 may be applied to form a layer which will cover the reinforcing metal 20 and if desired, a second layer 21 of the same or a superior quality may be applied to the first layer to impart a finish to the plastic or cement side of the wall or siding.

It is preferred to make the clapboard sheet of asbestos protected metal, as the asbestos layer, which is exposed on the clapboard side of the wall, siding or like structure, not only renders the wall fire-proof on the interior, but adds a finish to the wall, as it can be left in its natural or normal condition or it may be painted any desired color. Furthermore, the asbestos layer on the back or rear side of the clapboard sheet, not only adds to the fire-resisting properties of the wall, but also absorbs moisture from the plastic material and thereby effects a firmer adhesion or natural bonding of the plastic material to the clapboard sheet.

From the above description, it will be seen that a light, durable, fire-proof and substantially inexpensive wall is obtained, which is capable of use to advantage for inside and outside walls of a building.

A composite building structure comprising a metal sheet having on one surface a water-proofing and insulating cement, a layer of asbestos fabric affixed to said sheet by said cement, and a layer of reinforced concrete united to the asbestos fabric by a natural bonding of the fibers of the asbestos fabric with the concrete, and a second layer of asbestos fabric cemented to the opposite surface of the metal sheet and exposed in its natural condition, is not herein claimed, as it forms the subject-matter of another application Serial Number 654,123 filed by me October 11, 1911.

Claim:

A composite building structure comprising a metal sheet having a plurality of substantially parallel inclined sections and substantially horizontal sections, a waterproofing and insulating cement covering the opposite surfaces of said metal sheet, layers of asbestos fabric affixed to the opposite surfaces of said metal sheet by said cement, a layer of plastic material united to a layer of asbestos fabric by a natural bonding of the fibers of the asbestos fabric with the plastic material, and a metal reinforcement for said plastic material, substantially as described.

In testimony whereof, I have signed my name to this specification in the presence of two subscribing witnesses.

PEREZ M. STEWART.

Witnesses:
JAS. H. CHURCHILL,
J. MURPHY.

---

Copies of this patent may be obtained for five cents each, by addressing the "Commissioner of Patents, Washington, D. C."